Patented Mar. 2, 1943

2,312,413

UNITED STATES PATENT OFFICE 2,312,413

MANUFACTURE OF FLUOSULPHONATES

Ralph K. Iler, East Cleveland, Ohio, assignor to E. I. du Pont de Nemours & Company, Wilmington, Del., a corporation of Delaware No Drawing. Application December 27, 1939, Serial No. 311,139

2 Claims. (Cl. 23—50)

This invention relates to methods for making fluosulphonates, and is more particularly directed to processes whereby fluosulphonates are produced comprising causing interaction between fluorides and chlorosulphonic acid by mixing the fluorides and chlorosulphonic acid under conditions such that contact between them is effected, the reactants being maintained at an elevated temperature during such contact.

The methods heretofore known for making fluosulphonates have consisted essentially of decomposing fluorides with fluosulphonic acid. These methods have been generally unsatisfactory because the reaction proceeds slowly and incompletely. The processes have also suffered from the disadvantage that the fluosulphonic acid used as a starting material and the hydrofluoric acid produced as a by-product are extremely corrosive, this fact making such processes dangerous to operate. The handling of the by-product hydrofluoric acid has been avoided by substituting chlorides for the fluorides as a starting material, but this does not, of course, avoid the handling of fluosulphonic acid. These difficulties are sufficiently troublesome to make commercially unattractive the methods in which they are encountered.

Now I have found that fluosulphonates of relatively high purity may be rapidly and easily prepared by processes comprising causing interaction between fluorides and chlorosulphonic acid by mixing the fluorides and chlorosulphonic acid under conditions such that contact between them is effected, the reactants being maintained at an elevated temperature during such contact.

Reasoning by analogy from the fact that fluorides react with fluosulphonic acid to give fluosulphonates, one might expect that fluorides would form chlorosulphonates when treated with chlorosulphonic acid. However, I have found that such is not the case, and that instead chlorosulphonic acid appears to break up, giving up to the fluoride the $SO_3$ it contains, and forming hydrogen chloride as a by-product.

When a fluoride is reacted with chlorosulphonic acid according to a process of my invention, the reaction proceeds rapidly as compared with the reaction between fluosulphonic acid and the same fluoride. This acceleration of the rate whereby fluosulphonates may be produced overcomes one of the serious obstacles heretofore standing in the way of the commercial production of fluosulphonates.

Since hydrochloric, rather than hydrofluoric, acid is a by-product of a process of my invention and since high concentrations of hydrofluoric acid are not formed during the reaction, the dangers heretofore encountered due to the necessity of handling hydrofluoric acid are avoided.

The nature of my novel processes for making fluosulphonates and their manner of application will be better understood by considering the following illustrative examples. While these examples will show the application of my novel processes to particular materials under particular conditions, my invention is not to be construed to be limited by such materials or conditions.

Examples 1 shows the production of calcium fluosulphonate by the reaction of chlorosulphonic acid upon calcium fluoride in accordance with a process of my invention.

Example 1

Into a reaction vessel fitted with a cover and stirring device there was placed 82.2 parts by weight of finely pulverized fluorspar containing ninety-five per cent of calcium fluoride, $CaF_2$. The reaction vessel was closed and fitted with a reflux condenser. Through the reflux condenser there was added slowly 233 parts by weight of chlorosulphonic acid, the mixture being agitated during this addition. The temperature of the reaction mixture was maintained between 50 and 100° C. during the addition of the chlorosulphonic acid and after all the chlorosulphonic acid had been added, the stirring was continued and the temperature was raised to from 125–150° C. in order to complete the reaction. During the reaction hydrogen chloride gas was evolved through the reflux condenser. The time required for the chlorosulphonic acid addition was fifteen minutes, and the time of heating at the elevated temperature was one hour.

After the reaction was completed, there remained in the reaction vessel a light brown pulverulent product which by analysis was identified as largely calcium fluosulphonate, $Ca(FSO_3)_2$, which contained at least some of the impurities which were present in the fluorspar used.

While in Example 1 I have shown the addition of chlorosulphonic acid to a fluoride to make a fluosulphonate, a further feature of my invention comprises the formation of the necessary chlorosulphonic acid in situ in the reaction vessel. Thus Example 2 shows the application of a process of my invention in which the required chlorosulphonic acid is formed in situ in the reaction vessel by the interaction of sulphur trioxide and hydrogen chloride,

Example 2

Into the same reaction vessel as used in Example 1 there was placed 82 parts by weight of finely pulverized fluorspar containing ninety-five per cent calcium fluoride, $CaF_2$. Through a reflux condenser there was then cautiously added a mixture containing 144 parts by weight of liquid sulphur trioxide and 23.5 parts by weight of chlorosulphonic acid, $HClSO_3$, the chlorosulphonic acid containing 16 parts by weight of combined $SO_3$ or one-tenth of the total $SO_3$ calculated to be required for complete conversion of the calcium fluoride to calcium fluosulphonate. During the addition the mixture in the reaction vessel was agitated and the temperature was maintained at about 50° C. When the chlorosulphonic acid-sulphur trioxide mixture had all been added the temperature was gradually raised to 150° C. During this time hydrogen chloride gas was evolved and this gas reacted with the uncombined sulphur trioxide to regenerate chlorosulphonic acid as originally present.

There was obtained a light brown pulverulent product which by analysis was shown to be about ninety-eight per cent calcium fluosulphonate, the remaining two per cent being impurities introduced by the fluorspar.

Examples 1 and 2 show applications of my novel processes for making fluosulphonates in which the fluorides used as the starting point were in finely pulverized condition. I have found that it is not always feasible to reduce the fluorides to a finely divided state before initiating the reaction. A further aspect of my invention therefore comprises preparing fluosulphonates from fluorides by subjecting the fluorides to attrition in the presence of chlorosulphonic acid, whereby a substantially complete reaction is obtained without the necessity of previously grinding the fluorides. Example 3 shows the application of a process including this aspect of my invention.

Example 3

A tube mill mounted on trunnions and containing suitably sized balls as the grinding medium was fitted with inlet and outlet connections at its opposite ends so that a sulphur trioxide-containing gas could be passed thru the mill. The mill was inclined slightly so that material contained in the mill would work toward the lower end as the mill was revolved.

Into the upper end of the mill there was charged granular fluorspar containing ninety-five percent by weight of calcium fluoride. The mill was caused to revolve on the trunnion and the interior temperature was raised to about 100° C. by external heating. Into the upper end of the mill there was then introduced through the gas inlet a stream of gas representative of the gas obtainable from a commercial sulphuric acid contact converter system and containing ten per cent by volume of sulphur trioxide, to which converter gas had been added one per cent by volume of chlorosulphonic acid vapor, the balance of the gas being inert. Revolution of the drum and addition of the gas was continued at such a rate that the product emitted from the lower end of the mill would take up no further amounts of sulphur trioxide.

The product of the reaction was obtained in the form of a brownish powder which upon analysis was found to consist substantially of calcium fluosulphonate slightly contaminated with impurities from the original fluorspar.

The necessity of having present at least a small amount of chlorosulphonic acid in a process of my reaction was demonstrated by passing a ten per cent $SO_3$ converter gas containing no chlorosulphonate or its equivalent over fluorspar in the absence of chlorosulfonic acid or chlorides, the apparatus used and the conditions of the experiment being otherwise identical with Example 3. The product of this experiment, after a run equivalent in time to that of Example 3, was found by analysis to contain only a trace of calcium fluosulphonate.

It will be seen that by applying a process of my invention, substantially in accordance with the teachings of Example 3, a fluosulphonate may be produced from a fluoride by a continuous process. It will also be seen that the chlorosulphonic acid, required to be present in a process of my invention, may be continuously regenerated in the reaction vessel by the addition of sulphur trioxide-containing gas, provided a small amount of the chlorosulphonic acid or its equivalent is initially present to start the reaction.

I have shown in the foregoing examples that when fluosulphonates are made by the interaction of the chlorosulphonic acid with a fluoride, the chlorosulphonic acid need not be initially present in an amount stoichiometrically equivalent to the fluoride provided the conditions of the reaction are such that the chlorosulphonic acid is continuously regenerated in the presence of the fluoride. Thus, when sulphur trioxide is added continuously to regenerate the chlorosulphonic acid, the amount of chlorosulphonic acid present may advantageously be from about one to about ten per cent by volume of the sulphur trioxide. The use of larger amounts than this increases the volume of hydrogen chloride which must be recovered or otherwise disposed of, while smaller amounts than one per cent cause a proportionately small increase in the reaction rate. If the conditions of the reaction are such that the chlorosulphonic acid is not regenerated, it will be desirable to add the chlorosulphonic acid in stoichiometric proportions, that is, two mols of chlorosulphonic acid per mol of fluoride.

When a chlorosulphonate is made from a fluoride by a process of my invention, I have found that the chlorosulphonic acid required to be present need not be added as such, but may be formed in situ in the reaction vessel by having present constituents capable of forming it. Thus, in some instances I may effect the presence of chlorosulphonic acid by adding hydrogen chloride gas together with sulphur trioxide. Alternatively, I may mix a small amount of a chloride such as sodium, calcium, iron, or aluminum chloride with the fluoride and form chlorosulphonic acid in situ by introducing moisture together with sulphur trioxide. Other means for accomplishing the same result will be apparent to those skilled in the art.

The processes of my invention are broadly applicable to the manufacture of fluosulphonates from fluorides which exist in the solid state under ordinary conditions. Representative of such fluorides is the alkaline earth metal fluoride, fluorspar, the use of which I have shown in the foregoing examples. The processes are equally applicable to the manufacture of chlorosulphonates from other alkaline earth fluorides such as barium and strontium fluorides, to alkali metal fluorides with which may be included ammonium fluoride as well as fluorides of the metals such as sodium and potassium ordinarily included in this group, and to other fluorides which exist as solids under normal conditions.

My novel processes for making fluosulphonates from fluorides should preferably be carried out at temperatures from about 40 to 150° C. I have found that below about 40° C. chlorosulphonic acid appears to react with fluorides to give an apparently dry mass but that the product so obtained contains considerable amounts of hydrogen chloride which appears to be loosely held and is evolved from the product upon standing. Above about 150° C., on the other hand, the disadvantage is encountered that the chlorosulphonic acid exists in the vapor state unless the reaction is carried out under pressure, hence the reaction is retarded. More particularly, I prefer to initiate the reaction between the fluoride and chlorosulfonic acid at a temperature in the range from about 40 to 100° C. and then to elevate the temperature to from about 100 to 150° C. to complete the reaction. It will be apparent from the foregoing examples that some variation in this choice of temperatures can be made, depending on the manner and choice of equipment in which the reaction is carried out.

While in the foregoing disclosure I have described the processes of my invention as applied to particular conditions, materials, and apparatus, it will be apparent that without departing from the scope of my invention those skilled in the art may employ various modifications of such processes for making fluosulphonates by reacting fluorides with chlorosulphonic acid.

I claim:

1. In a process for producing a metal fluosulphonate, the steps comprising causing interaction between chlorosulphonic acid and a metal fluoride selected from the group consisting of alkali metal, alkaline earth metal, and ammonium fluorides, by mixing the fluoride and chlorosulphonic acid under conditions such that contact between them is effected, maintaining the reactants at a temperature of about from 40–150° C. during such contact, evolving from the reaction mixture hydrogen chloride formed by the reaction, and recovering as the product of the reaction the fluosulphonate of the metal fluoride used.

2. In a process for producing a metal fluosulphonate, the steps comprising causing interaction between chlorosulphonic acid and a metal fluoride selected from the group consisting of alkali metal, alkaline earth metal, and ammonium fluorides, by mixing the fluoride and chlorosulphonic acid under conditions such that contact between them is effected, maintaining the reactants at a temperature of about from 40–150° C. during such contact and effecting the contact by subjecting the fluoride to attrition in the presence of the chlorosulphonic acid, evolving from the reaction mixture hydrogen chloride formed by the reaction, and recovering as the product of the reaction the fluosulphonate of the metal fluoride used.

RALPH K. ILER.